United States Patent
Schneider et al.

(10) Patent No.: US 6,987,249 B2
(45) Date of Patent: Jan. 17, 2006

(54) APPARATUS AND REGULATING METHOD FOR ELECTRICALLY HEATING A MOTOR VEHICLE

(75) Inventors: Stephan Schneider, Radevormwald (DE); Bernd Friellngsdorf, Bergisch Gladbach (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/656,992

(22) Filed: Sep. 5, 2003

(65) Prior Publication Data

US 2004/0149726 A1    Aug. 5, 2004

(30) Foreign Application Priority Data

Sep. 5, 2002  (DE) ............................. 020 19 962

(51) Int. Cl.
   *H05B 1/02*    (2006.01)

(52) U.S. Cl. .................. 219/506; 219/497; 219/202; 307/117

(58) Field of Classification Search ........ 219/202–205, 219/501, 494, 492, 497, 499, 506, 508; 307/117, 307/39–41; 374/120, 121; 123/142.5 R
See application file for complete search history.

(56) References Cited

U.S. PATENT DOCUMENTS

| | | | | |
|---|---|---|---|---|
| 5,015,826 A | * | 5/1991 | Curti | 219/492 |
| 5,369,247 A | * | 11/1994 | Doljack | 219/485 |
| 5,568,052 A | * | 10/1996 | Sway-Tin et al. | 324/435 |
| 6,002,105 A | | 12/1999 | Tamada | |
| 2001/0054608 A1 | * | 12/2001 | Ohkuma et al. | 219/205 |

* cited by examiner

*Primary Examiner*—Mark Paschall
(74) *Attorney, Agent, or Firm*—Gary Smith

(57) ABSTRACT

The invention relates to an electric heating system for a motor vehicle in which a PTC heating element (4) is controlled by a regulator (1) by means of an infinitely variable electronic power system (2). The regulator (1) receives a status signal (u) that indicates the power available from the dynamo (6). The control signal (x) for the electronic power system (2) is preferably calculated from the latter by means of a PI algorithm in such a way that the dynamo/altenator (6) is utilized to a maximum degree without putting at risk a sufficient supply to other electrical loads (5). The regulator (1) can also be connected to a user interface (3) for displaying and/or inputting information.

5 Claims, 2 Drawing Sheets

APPARATUS AND REGULATING METHOD FOR ELECTRICALLY HEATING A MOTOR VEHICLE

TECHNICAL FIELD

This invention relates to an electric heating system for a motor vehicle, comprising a heating element for converting the electrical power drawn from an electrical energy source into heat, and a regulating method for regulating the supply of electrical power to the heating element. In addition, the invention relates to a method for regulating the supply of the electrical power drawn from an electrical energy source to the heating element of a motor vehicle.

BACKGROUND OF THE INVENTION

Owing to the increasing efficiency of modern motor vehicle engines, in particular diesel engines, the dissipated heat that is output by the engine may no longer be sufficient to heat the passenger compartment adequately. For this reason, motor vehicles are provided with electric heating systems that have a heating element for converting the electrical power drawn from an electrical energy source, for example the dynamo or the battery, into heat. A heating system that is made up of two PTC (positive temperature coefficient) heating elements is described, for example, in U.S. Pat. No. 6,002,105. Here, the two heating elements are switched on or off by a regulating system as a function of the heating demands of the passenger compartment.

Furthermore, it is to be noted that in modern motor vehicles the demand for electrical energy is increasing as a result of the increasing use of electronics and electrical loads. This leads, in known heating systems, to a situation in which they can overload the electrical energy source, or are required to be operated in a state below the maximum power as a precaution.

It would therefore be desirable to provide an electric heating system for a motor vehicle and a method for regulating it that ensures that the maximum heating power is made available, while also insuring sufficient availability of the electrical energy source for the loads and for starting the engine.

SUMMARY OF THE INVENTION

The present invention provides an apparatus and regulating method for electrically heating a motor vehicle.

In one aspect of the invention, an electric heating device for a motor vehicle is disclosed. This system comprises an electrical energy source. This system further comprises a heating element. This system also comprises a regulating circuit that operatively connects the electrical energy source to the heating element. The regulating circuit determines a power level based on a status signal and supplies this power level to the said heating element from the electrical energy source, wherein the status signal is related to a current maximum available power level of the electrical energy source.

In another aspect of the invention, a method for regulating the supply of power to a heating element of a motor vehicle is disclosed. This method comprises the step of determining a status signal, which is related to a current maximum available power level of an electrical energy source. This method further comprises the step of determining a power level based on the status signal. The method also comprises the step of supplying the power level from the electrical energy source to the heating element.

One advantage of the invention is that the heating element may be operated at the maximum available power level at all time, thereby providing heat in the quickest possible manner. Another advantage of the invention is that continuously variable heating regulation provides for the most optimum use of the available power by the heating element.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
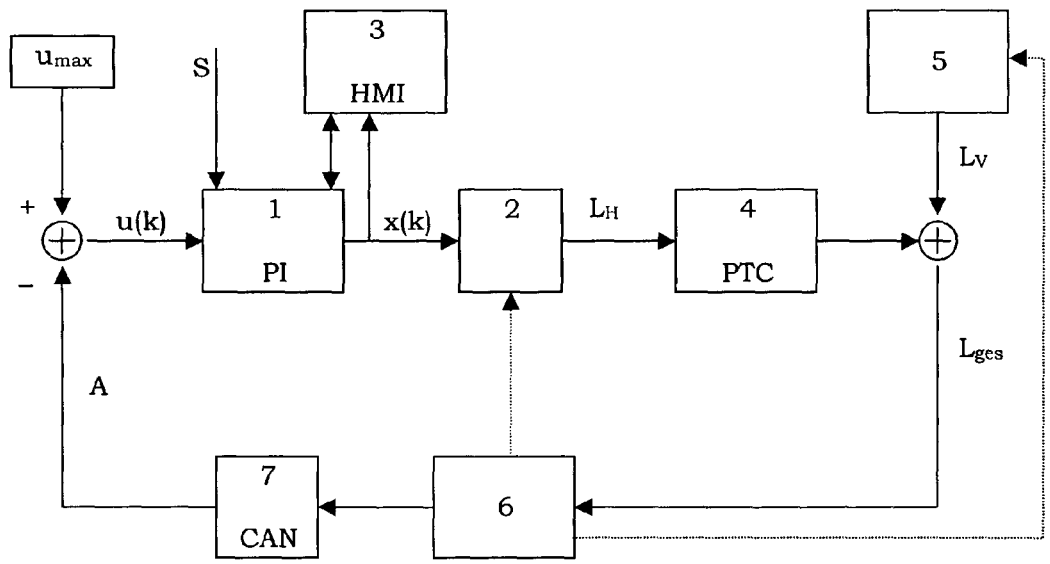
FIG. 1 shows a regulating scheme of the heating system according to the present invention.

One embodiment of the present invention is an electric heating system for motor vehicles that contains a heating element that converts electrical power drawn from an electrical energy source into heat. In addition, a regulating system is provided that regulates the magnitude of the electrical power fed to the heating element. The heating system is defined in that the regulating system contains a status signal which indicates the readiness of the energy source to provide power at a particular time, that is to say provides information on how much power the energy source can output at a particular time. In addition, the regulating system is designed such that the electrical power that is fed to the heating element is a function of the aforementioned status signal.

Such a heating system has the advantage of taking into account the current power capacity of the energy source in the metering of electrical power to the heating element. For this reason, the heating element can throttle the supply of energy to the heating element, in particular when there is a low power capacity at a particular time, with the result that the drain on the energy source is limited and it retains sufficient power capacity for functions with a higher priority, for example, starting the engine. Additionally, the heating system is also capable of utilizing the available readiness of the energy source to provide power up to the permitted limits so that the passenger compartment of the motor vehicle can be heated as quickly as possible.

According to one preferred embodiment of the heating system, the regulating system is connected to the heating element via a power stage, the power stage permitting the electrical power which is output to the heating element to be set in a continuous, i.e., infinitely variable, way. In contrast to known heating systems, the power that is fed to the heating element can thus be changed not only in discrete, relatively large increments, but also in increments of virtually any desired fineness. This makes it possible to exploit the readiness of the energy source to provide power up to the permitted limits.

The electrical energy source preferably contains a dynamo (or alternator). The status signal that is transferred to the regulating system is dependent upon the capacity utilization of the dynamo. In particular, the status signal can represent the working cycle or the duty cycle of the dynamo. In this embodiment, the power status of the dynamo is taken into account as it is mainly responsible for meeting all the ongoing electrical energy requirements. By means of the capacity utilization of the dynamo it is also sensed to what degree other loads of the motor vehicle draw power from the energy source.

According to one embodiment of the heating system, its regulating system is connected to a user interface. The electrical power that is fed to the heating element at a particular time can be displayed or indicated on the user interface, for example visually or audibly, so that the user of the motor vehicle is informed of this. In addition, or alternatively, the user interface can also be configured for a user to input setting signals, these setting signals comprising parameters such as the desired temperature of the passenger compartment.

In accordance with another embodiment of the heating system, its regulating system is connected to signal lines that carry signals relating to the ambient temperature of the motor vehicle, the temperature of the engine, the temperature of the passenger compartment, the humidity, the battery voltage, the battery charge status and/or the status of other electrical loads. These signal are determined by various sensors, e.g., temperature sensors, as is well known in the art. As a result of the connection to these signal lines, the regulating system can take into account the respective information when determining the power fed to the heating element, and can thus regulate the heating in an optimum way.

The regulating system is preferably embodied in such a way that it processes the status signal with a proportional-integral (PI) control algorithm. Such an algorithm has a well known regulating behavior so that stable and reliable heating regulation can be set.

The invention also relates to a method for regulating the supply of the electrical power drawn from an electrical energy source to the heating element of a motor vehicle. The method can be used here, for example, in a heating system of the type described above. The method is defined in that the supply of power is regulated as a function of a status signal which indicates the readiness of the energy source to supply power. As has been explained above in conjunction with the heating system, the heating element can be operated in such a way that on the one hand the energy source maintains a sufficient power capacity at all times in accordance with the set priorities of the loads, and that on the other hand the maximum heating power is achieved. The power that is fed to the heating element is preferably continuously variable, instead of in increments, in order to exploit the available limits as completely as possible.

In the method, the supply of electrical power or the control signal which controls this supply is preferably limited to a maximum value so that overloading of the heating element is ruled out.

Furthermore, the supply of electrical power or the associated control signal is preferably calculated with a proportional-integral (PI) algorithm. This algorithm may be implemented either discretely over time or continuously over time.

In the aforesaid PI algorithm, in particular two different proportional factors can be used, which are each applied depending on the sign of the status signal. If, for example, given a corresponding definition, a negative status signal indicates that the energy source cannot supply any further power, or is already overloaded, this can be taken into account with a larger proportional factor than if the status signal indicates that a positive power capacity is still present.

According to the representation in FIG. 1, the invention relates to the regulation of the electrical power $L_H$ which is fed to an electric heating element, for example a PTC element 4, of a motor vehicle. The heating element 4 is necessary here to ensure rapid and sufficient heating of the passenger compartment of the vehicle if this cannot be achieved solely by means of the dissipated heat of the engine of the motor vehicle.

The electrical power which is fed to the heating element 4 is drawn essentially from a dynamo 6 of the motor vehicle, which also has to supply other electrical loads 5 with a power $L_V$. The entire power drain from the dynamo 6 is therefore $L_{ges}=L_H+L_V$.

The objective of optimized regulation of the electrical power $L_H$ which is fed to the heating element 4 is then, on the one hand, to make as large a setting as possible of its value in order to attain maximum heating success, and, on the other hand, to ensure in this context that the dynamo 6 is not overloaded and a sufficient supply to the other loads 5 is ensured.

In order to achieve this objective, the invention provides a regulator 1 whose control signal x(k) is fed to an electronic power system 2 and by this means controls in an infinitely variable fashion the electrical power $L_H$ which is output to the heating element 4. The index k stands for a discretized point in time here.

The particular feature of the regulator 1 is that it receives a status signal u(k) which signals the readiness of the dynamo 6 to provide power, thus indicating how much power can be drawn at maximum from the dynamo at a particular time. The status signal u(k) is calculated as the difference from a maximum power $u_{max}$ which can be drawn (which may depend if appropriate on different variables such as for example the engine operating state) and a signal A which is transmitted by the dynamo 6 via a multiplex on-board network 7 (for example CAN, MOST, LIN etc.) which represents the working cycle or the duty cycle of the dynamo 6.

Moreover, the regulator 1 can receive further signals S which represent, for example, the ambient temperature of the motor vehicle, the temperature of the engine, the temperature of the passenger compartment, the humidity in the passenger compartment or in the surroundings, the charge state of the battery, the battery voltage and/or the status of other electrical loads 5 (for example voltage, current requirement). The signals can be used for a further setting of the control signal x(k).

As is also apparent from FIG. 1, the regulator 1 is connected to a user interface 3 (HMI: Human Machine Interface). This can have visual, audible or tactile display/indicator devices such as display instruments, a voice feedback (chimes) or switches for the various positions. Furthermore, the interface 3 can contain tactile or audible input devices such as pushbutton keys, switches, a touchscreen or a voice input by means of which the user can activate the functions and monitor the behavior at a particular time.

With the heating system that is illustrated it is possible to use the available electrical power to the best possible degree at any time. This is achieved on the one hand in that the regulator 1 uses the working cycle A of the dynamo 6 and further variables S in order to calculate the ideal operating point of the heating element 4. Furthermore, it is significant that the electronic power system 2 permits infinitely variable setting of the electrical heating power $L_H$ which is output to the heating element 4, so that the available scope can be exploited to a maximum degree.

Figure 2:
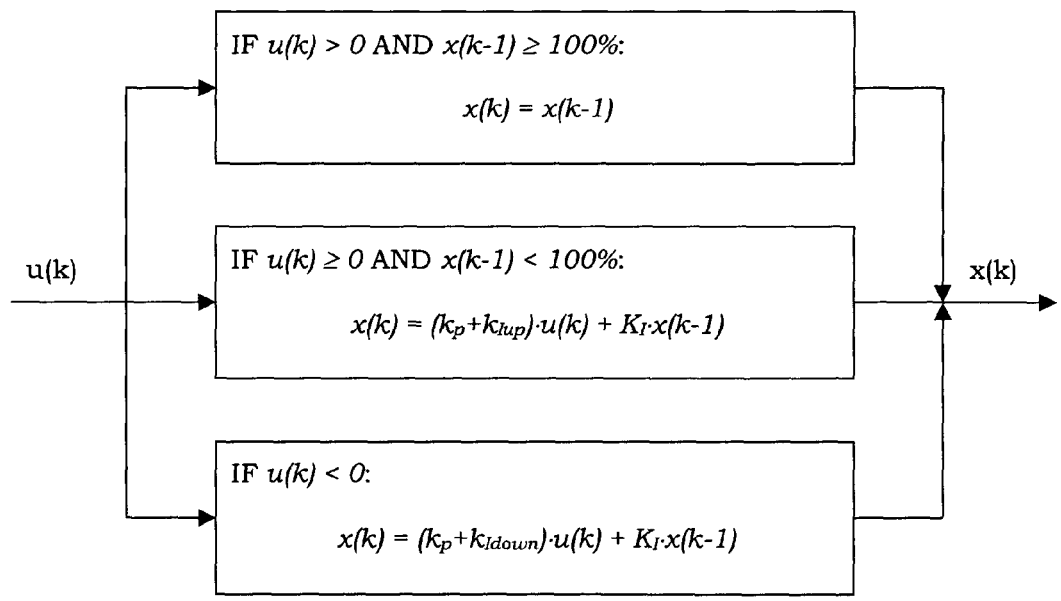
FIG. 2 shows a block diagram of the proportional-integral algorithm that is implemented in the regulator of the present invention according to FIG. 1.

FIG. 2 shows an exemplary PI algorithm which can be used in the regulator 1 in FIG. 1 to calculate the control signal x(k) from the status signal u(k). In this algorithm, three cases are distinguished here:

1st case: If power capacity is still available and the power that is output is already at a maximum, its value remains unchanged, i.e.:

$$u(k)>0 \text{ AND } x(k-1) \geq 100\% \Rightarrow x(k)=x(k-1)$$

2nd case: If power capacity is still available and the power which is output is still not at a maximum, its new value is increased according to a PI algorithm with at first proportional factor $k_p+k_{Iup}$ i.e.:

$$u(k) \geq 0 \text{ AND } x(k-1)<100\% \Rightarrow x(k)=(k_p+k_{Iup}) \cdot u(k)+K_I x(k)$$

3rd case: If power capacity is not still available, the power that is output is reduced according to a PI algorithm with a second proportional factor case $k_p+k_{Idown}$, i.e.:

$$u(k)<0 \Rightarrow x(k)=(k_p+k_{Idown}) \cdot u(k)+K_I x(k-1)$$

By using two different proportionality factors it is possible to react in a respectively different and optimum way to the $3^{rd}$ case of the dynamo 6 being overloaded and to the $2^{nd}$ case of an existing power reserve.

Figure 3:
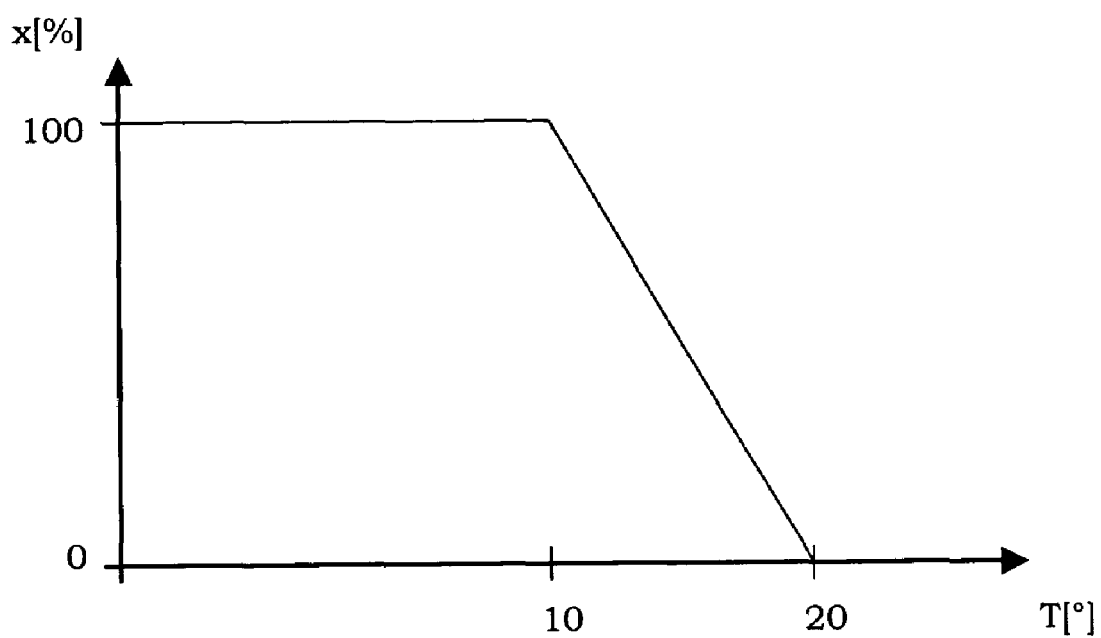
FIG. 3 shows a diagram of the power fed to the heating element as a function of the temperature, in an example embodiment of the present invention.

FIG. 3 is a diagram showing a further limiting function—which can be integrated in the regulator 1 in FIG. 1 and is dependent on the temperature T of the passenger compartment—for the control signal s(k). According to the diagram, said control signal x(k) is limited to the maximum value of 100% below a measured temperature of the passenger compartment of approximately 10° C., and then decreases linearly to 0% between 10° C. and 20° C.

While particular embodiments of the invention have been shown and described, numerous variations and alternate embodiments will occur to those skilled in the art. Accordingly, it is intended that the invention be limited only in terms of the appended claims.

What is claimed is:

1. An electric heating device for heating the passenger cabin of a motor vehicle comprising:
   an electrical energy source,
   a heating element, and
   a regulating circuit, said regulating circuit operatively connecting said electrical energy source to said heating element, with said regulating circuit being capable of providing a continuously variable power level to said heating element,
   wherein said regulating circuit determines a power level based on a status signal and supplies said power level to said heating element from said electrical energy source,
   wherein said status signal is related to a current maximum available power level of said electrical energy source.

2. The electric heating device of claim 1, wherein said electrical energy source is an alternator.

3. The electric heating device of claim 1, further comprising a user interface, said user interface being capable of providing a visual display indicative of said power level to a user.

4. The electric heating device of claim 1, wherein said status signal is further related to at least one of an ambient temperature, an engine temperature, a passenger compartment temperature, a humidity level, a battery voltage, a battery charge state, and an electrical load state.

5. The electric heating device of claim 1, wherein said power level is determined by said regulating circuit by processing said status signal with a proportional-integral algorithm.

* * * * *